United States Patent [19]

Yamaoka et al.

[11] Patent Number: 5,311,289
[45] Date of Patent: May 10, 1994

[54] PICTURE PROCESSING METHOD IN OPTICAL MEASURING APPARATUS

[75] Inventors: Naoji Yamaoka; Manabu Tuchida; Yukihiro Yaguchi, all of Sayama, Japan

[73] Assignee: Honda Giken Kogyo Kabushiki Kaisha, Tokyo, Japan

[21] Appl. No.: 936,301

[22] Filed: Aug. 28, 1992

[30] Foreign Application Priority Data

Sep. 9, 1991 [JP] Japan .................................... 229214
Sep. 9, 1991 [JP] Japan .................................... 229215

[51] Int. Cl.$^5$ ............................................ G01B 11/24
[52] U.S. Cl. .................................... 356/375; 356/376; 382/8
[58] Field of Search ............. 356/375, 376, 394; 382/8; 358/101, 106, 107

[56] References Cited

U.S. PATENT DOCUMENTS

| 4,801,207 | 1/1989 | Williams | 356/376 |
| 4,961,155 | 10/1990 | Ozeki et al. | 364/559 |
| 5,129,010 | 7/1992 | Higuch et al. | 382/8 |

FOREIGN PATENT DOCUMENTS 2207243 1/1989 United Kingdom .

OTHER PUBLICATIONS

Japanese Patent Publication No. 62-56814, Mar. 12, 1973, with English Abstract.

Primary Examiner—F. L. Evans
Attorney, Agent, or Firm—Armstrong, Westerman, Hattori, McLeland & Naughton

[57] ABSTRACT

An optical measuring apparatus for use in this method has a projector for radiating a slit light on a workpiece and an image sensing device for picturing an optically cross-sectional image drawn by the slit light radiated on the workpiece. An optical axis of the slit light and an optical axis of the image sensing device cross each other at an oblique angle. Setting windows are set at predetermined positions of the optically cross-sectional image on a screen of the image sensing device. A position of center of gravity of each optically cross-sectional image in each of the windows is measured. An amount of displacement in an X-axis direction of the optically cross-sectional image on the screen is measured. A rate of magnification of the optically cross-sectional image in a Y-axis direction is calculated from the amount of displacement. Setting positions of the windows in the Y-axis direction and sizes thereof in the Y-axis direction are changed depending on the rate of magnification.

5 Claims, 8 Drawing Sheets

PICTURE PROCESSING METHOD IN OPTICAL MEASURING APPARATUS

BACKGROUND OF THE INVENTION

1. Field of the Invention

The present invention relates to a picture processing method in an optical measuring apparatus which comprises a projector for radiating a slit light on a workpiece and an image sensing device for picturing an optical cross-sectional image (i.e., an image of light representing the cross section) which is formed by the slit light radiated on the workpiece, the projector and the image sensing device being so arranged that the optical axis of the slit light and the optical axis of the image sensing device cross each other at an oblique angle.

2. Description of the Related Art

It is conventionally known to use the above described kind of optical measuring apparatus to measure the shape and the position of a workpiece from an optical cross-sectional image on a screen of an image sensing device. In such a method, if there is a reference portion for measurement such as a corner in the optical cross-sectional image, it will be possible to measure the shape and the position of the workpiece on the basis of that reference portion. If, on the other hand, there is no such reference portion, it is considered to calculate equations for image lines of two predetermined image portions of the optical cross-sectional image, to obtain the position of a crossing point of the two image lines so that this crossing point can be used as an alternative to the corner.

The optical cross-sectional image becomes a band-like image having a certain degree of width. Therefore, when the equations for the image lines must be calculated as described above, windows are set at a plurality of positions in the optical cross-sectional image, a point of center of gravity of the optical cross-sectional image in each of these windows is measured, and equations for the image lines are calculated from these points of centers of gravity by regarding them to be curves or straight lines passing through those points of centers of gravity.

When the image lines are calculated, as described above, from the points of centers of gravity by setting windows, the setting positions of the windows must be changed depending on the displacement of the optical cross-sectional image so that, even if the optical cross-sectional image is displaced on a screen, the windows may be set in predetermined positions of the image.

Here, let an X-axis direction be in that coordinate direction on the screen which corresponds to the optical axis direction of the slit light, and let a Y-axis direction be in the direction which is perpendicular to the X-axis direction. Since the optical axis of the image sensing device is slightly inclined relative to the optical axis of the slit light, if the workpiece is displaced towards or away from the projector in the optical axis direction of the slit light, the optical cross-sectional image displaces on the screen in one or the other X-axis direction and, at the same time, the image is magnified or contracted in the Y-axis direction at a rate of magnification depending on the amount of displacement thereof in the X-axis direction. Therefore, if only the setting positions of the windows are changed depending on the displacement of the optical cross-sectional image, the relative positional relationship between the optical cross-sectional image and the windows will be deviated or offset depending on the changes in the rate of magnification of the image, with the result that the equations for the image lines cannot be correctly calculated.

OBJECT AND SUMMARY OF THE INVENTION

Taking the above disadvantage into consideration, the present invention has an object of providing a method of picture processing in which the windows can be correctly set in predetermined positions of an optical cross-sectional image even if the rate of magnification of the optical cross-sectional image is changed as a consequence of displacement of the workpiece in the direction of the optical axis of the slit light.

According to the present invention, the foregoing and other objects are attained by a picture processing method in an optical measuring apparatus which comprises a projector for radiating a slit light on a workpiece, and an image sensing device for picturing an optical cross-sectional image drawn by the slit light radiated on the workpiece, an optical axis of the slit light and an optical axis of the image sensing device being disposed in such a positional relationship so as to cross each other at an oblique angle, the method comprising the steps of: setting windows at predetermined positions on the optical cross-sectional image on a screen of the image sensing device; and measuring a position of center of gravity of each optical cross-sectional image in each of the windows; wherein an amount of displacement in an X-axis direction of the optical cross-sectional image on the screen is measured, the X-axis being defined to be such a coordinate axis of the screen as to correspond to the optical axis of the slit light; a rate of magnification of the optical cross-sectional image in a Y-axis direction is calculated from the amount of displacement, the Y-axis being defined to be perpendicular to the X-axis; and at least setting positions of the windows in the Y-axis direction and sizes thereof in the Y-axis direction are changed depending on the rate of magnification.

Even if the workpiece is displaced in the direction of the optical axis of the slit light, resulting in an enlargement or contraction of the optical cross-sectional image in the Y-axis direction, the rate of magnification of the optical cross-sectional image is calculated from the amount of displacement thereof in the X-axis direction, and the setting positions in the Y-axis direction and the sizes in the Y-axis direction of the windows are changed accordingly. Therefore, the windows are correctly set in predetermined positions in the Y-axis direction of the optical cross-sectional image.

Normally, the optical cross-sectional image becomes one which normally extends in the Y-axis direction with a relatively narrow width in the X-axis direction. Therefore, if the size of the window in the X-axis direction is set large enough with an allowance, it is not particularly necessary to change the position and the size of the window in the X-axis direction. However, in case where the optical cross-sectional image is so largely inclined relative to the X-axis that it may go beyond the limit of the window in the X-axis direction, the size in the X-axis direction of the window can be changed depending on the rate of magnification.

In case where the optical cross-sectional image of a workpiece has a maximum portion in the X-axis direction, if the maximum portion has a corner to facilitate a clear recognition of a maximum point, the shape and the position of the workpiece can be easily measured on the basis of this maximum point. If, on the other hand, the maximum portion is round in shape, it becomes difficult to unequivocally determine the maximum point. As a solution, the following procedure may be considered. Namely, a plurality of predetermined windows are respectively set for those portions of the optical cross-sectional image which are positioned on each side of the Y-axis direction relative to the maximum portion. The position of center of gravity of the image in each of these windows is measured. An equation for the line on one side of the Y-axis direction and an equation for the line on the other side of the Y-axis direction are calculated and the position of a crossing point of both lines is obtained from these equations. The workpiece is thus measured by using this crossing point as an alternative to the maximum point.

In the aforementioned procedure, it is necessary to change the positional relationship in the Y-axis direction and the size in the Y-axis direction of each window in order to prevent the positional relationship of each window relative to the optical cross-sectional image from being displaced or deviated. In so doing, the problem will be where shall the reference point for setting these windows be set on the screen. It is normally considered to determine the setting position of each window on the basis of the maximum portion of the optical cross-sectional image. However, in the aforementioned case where the maximum portion is round in shape, the displacement in the X-axis direction of the maximum portion may be accurately detected to a certain degree, but the displacement in the Y-axis direction cannot be accurately detected. As a consequence, there is a possibility that the setting position of each window is displaced in the Y-axis direction.

In order to solve this kind of disadvantage, according to another aspect of the present invention, the following procedure is employed. Namely, the position of a tip in the X-axis direction of the maximum portion of the optical cross-sectional image is measured. Two pieces of windows which are elongated in the Y-axis direction are set at a position which is a predetermined distance backwardly away from the tip in the X-axis direction. A position of center of gravity of the optical cross-sectional image in each of the windows is measured. A reference point which has a correlation with both of the positions of centers of gravity is obtained. The aforementioned predetermined windows are respectively set in a predetermined positional relationship relative to the reference point.

According to this method, each of the windows elongated in the Y-axis direction is located in a predetermined portion of the optical cross-sectional image which extends to one side and to the other side of the Y-axis direction, at a position which is a predetermined distance backwardly away from the maximum portion in the X-axis direction. The position of the center of gravity in each of the windows elongated in the Y-axis direction is then measured, and a point which has a predetermined correlation to both positions of centers of gravity, such as an intermediate point of the two positions of centers of gravity, is determined to be the reference point. The X-axis and the Y-axis coordinate values of this reference point accurately represents the displacement of the optical cross-sectional image in the X-axis and the Y-axis directions.

Accordingly, even if the optical cross-sectional image is displaced on the screen in the X-axis and the Y-axis directions, each of the predetermined windows can be accurately set, on the basis of the aforementioned reference point, to one and the other portions in the Y-axis direction relative to the maximum portion of the optical cross-sectional image in a certain positional relationship with the image portions.

As a result, the equations for the image lines on one side and on the other side in the Y-axis direction can be accurately obtained from the position of center of gravity to be measured in each of the predetermined windows, and the shape and the position of the workpiece can be measured with a high degree of accuracy on the basis of that crossing point of the two image lines which can be obtained by the two equations.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
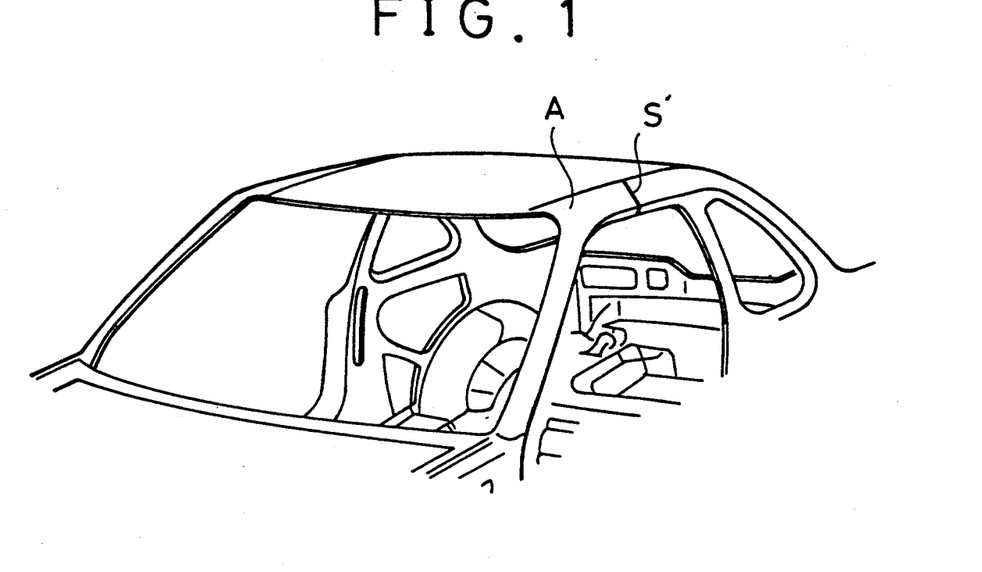
FIG. 1 is a perspective view of a workpiece.
Figure 2:
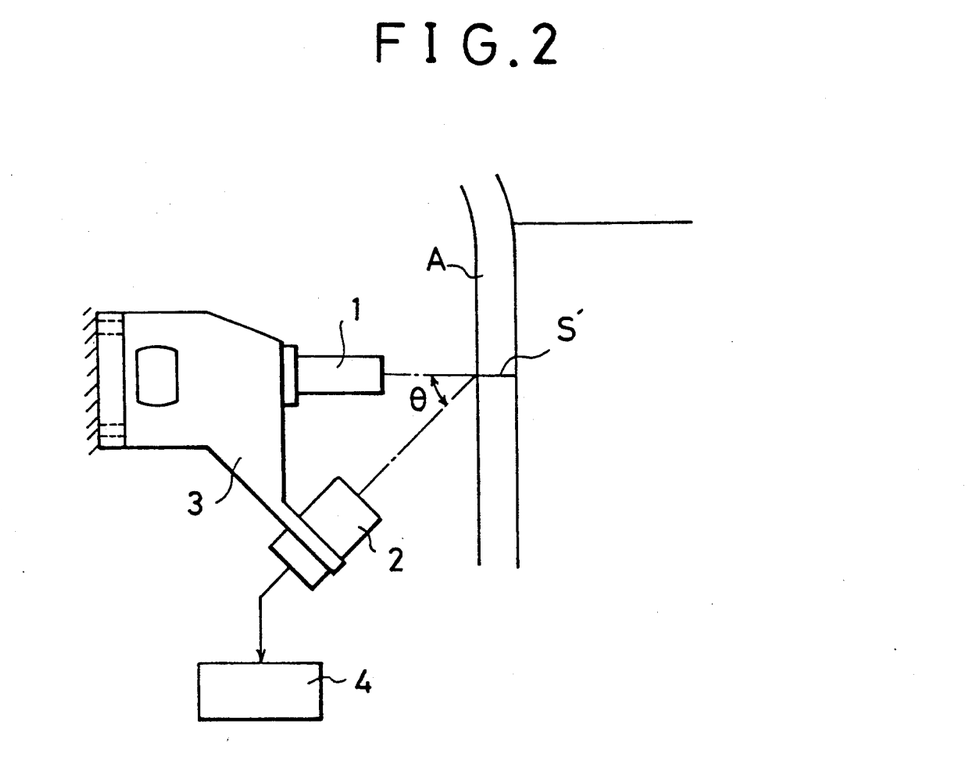
FIG. 2 is a plan view of one example of an optical measuring apparatus to which the present invention is applied.

In an illustrated embodiment, the method of the present invention is applied to picture processing in an optical measuring apparatus which measures the position of a workpiece A comprising a roof side rail of an automobile body shown in FIG. 1 on the basis of an optical cross-sectional image thereof, thereby judging the assembling accuracy of the automobile body. This measuring apparatus comprises, as shown in FIG. 2, a projector 1 which is made up of a laser or the like to radiate a vertical slit light towards the workpiece A and an image sensing device 2 which is made up of a CCD camera for picturing an optically cross-sectional image $S'$ of the workpiece A, i.e., the image of the slit light formed on the surface of the workpiece A. The projector 1 and the image sensing device 2 are mounted on a common base plate 3 in such a positional relationship that the optical axis of the projector 1 and the optical axis of the image sensing device 2 cross each other at a predetermined angle $\theta$. In FIG. 2, numeral 4 denotes an electronic control circuit for image processing.

Figure 3:
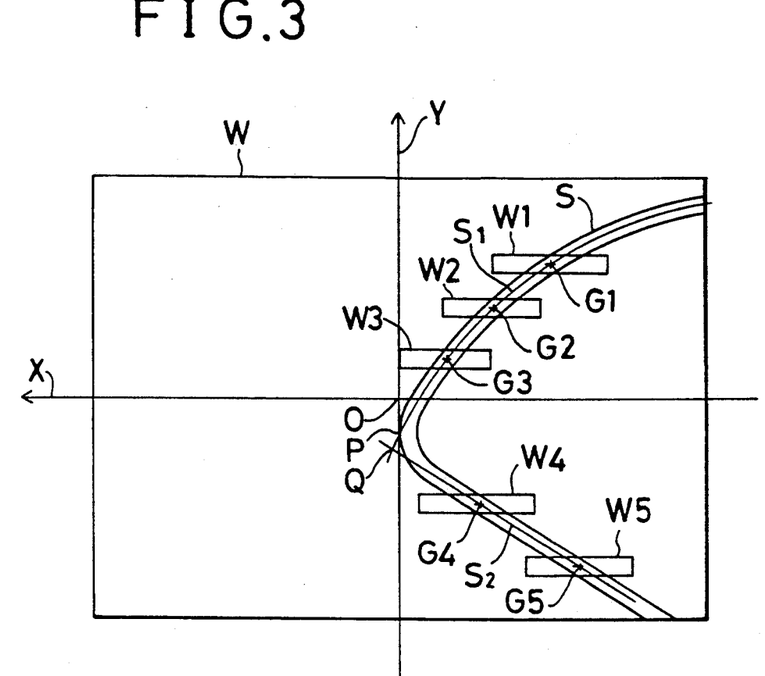
FIG. 3 is a diagram showing how to obtain a crossing point of image lines on both sides of a maximum portion of an optically cross-sectional image.

On a screen W of the image sensing device 2, which has a lateral coordinate axis defined as X-axis and a vertical coordinate axis defined as Y-axis, there is formed, as shown in FIG. 3, an optical cross-sectional image S which has a maximum portion in the X-axis direction, a curved portion on an upper side, and a straight portion on a lower side, respectively, in the Y-axis direction relative to the maximum portion. Since this image S is round in shape at the maximum portion, there is no corner portion which is suitable as a reference in determining its position. Therefore, the X,Y coordinate values, on the screen W, of a crossing point Q of a line $S_1$ in the curved portion and a line $S_2$ in the straight portion are calculated from an equation for the curve $S_1$ and an equation for the straight line $S_2$, and the position of the workpiece A is measured by using this crossing point Q as a reference point.

The equation for the curve $S_1$ can approximately be represented as an equation for a circle which passes through three points in a specific region of the curved portion. In order to obtain this equation, three pieces of first through third windows W1, W2, W3 are set in an upper half portion of the optical cross-sectional image S. The X,Y coordinate values of the center of gravity G1, G2, G3 of the optical cross-sectional image in each of the windows are then measured, and an equation for a circle to pass through these three centers of gravity is obtained as an equation for the curve $S_1$.

The optical cross-sectional image has a certain width, and the coordinate values of the center of gravity may vary with a slight difference of whether or not the light receiving amount of image elements located in the neighborhood of the border line of the image S exceeds a predetermined threshold value. As a result, the coordinate values of the same workpiece positioned in the same place may slightly vary from one another. When a comparison is made between the rate of change in the radius of the circle depending on the change in the coordinate values of the center of gravity G2 of the image in the intermediate second window W2 and the rate of change in the radius of the circle depending on the change in the coordinate values of the other centers of gravity G1, G3, the former rate of change is found larger. It follows that the error in the coordinate values of the center of gravity G2 largely affect the accuracy of the equation for the curve $S_1$ to be obtained.

Figure 4:
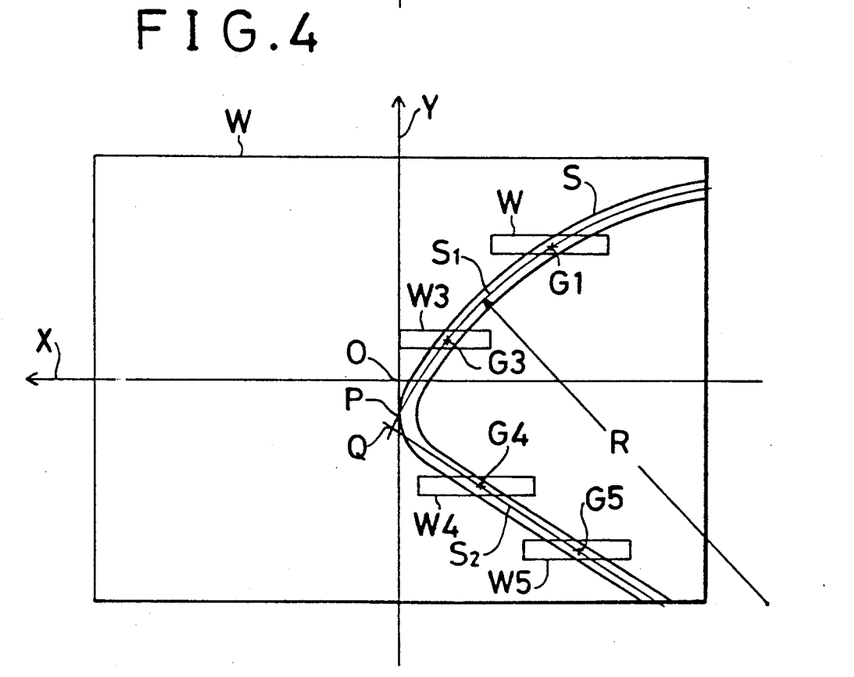
FIG. 4 is a diagram showing how to obtain an equation for an image line at a curved portion of the optical cross-sectional image by setting two windows.

On the other hand, the curvature of the workpiece A does not normally vary so much from piece to piece. Therefore, if its radius of curvature is measured in advance, the equation for the curve $S_1$ can be calculated from the coordinate values of the two points on the curve $S_1$ and the radius of curvature. In case the equation for a curve is calculated through sampling in a minute region, it is advantageous to calculate the equation of the curve $S_1$ from the two points and the radius of curvature, in order to improve the calculation accuracy of the equation by eliminating the effect of the error in the coordinate values of the window G2. Therefore, in the present embodiment, as shown in FIG. 4, two pieces of first and third windows W1, W3 are set in the upper half of the optical cross-sectional image S, and the coordinate values of center of gravity G1, G3 of the image in each of the windows are measured so that the equation for the curve $S_1$ can be calculated from those coordinate values and the radius of curvature R.

In measuring the radius of curvature R, a master workpiece of the same shape as the workpiece A is placed on a predetermined reference position to picture the optical cross-sectional image thereof. Then, three pieces of the aforementioned first through third windows W1, W2, W3 are set on the screen W. The radius of curvature of the optical cross-sectional image of the master workpiece is obtained from the center of gravity of image in each of these windows. This calculation work is repeated several times and an average value of the radius thus obtained is defined to be the radius of curvature R, which is then stored in memory in the electronic control circuit 4. As the master workpiece, an automobile body which is conveyed in a production line may be used when the measurement is carried out in the production line. In such a case, the first automobile body or several ones at the time of starting measurement are selected as the master workpieces.

The equation of the straight line $S_2$ of the optical cross-sectional image S of the workpiece A can be obtained by setting two pieces of fourth and fifth windows W4, W5 on the lower half of the image S and then measuring the coordinate values of the center of gravity G4, G5 of the image in each of the windows.

When the relative positional relationship between the workpiece A and the image sensing device 2 varies, the position of the optical cross-sectional image S on the screen W also varies. As a consequence, if the aforementioned windows W1 through W5 are set in fixed positions on the screen W, the windows may be off the optical cross-sectional image S or the windows W1, W3 which are to be set to the curved portion may fall on such a portion of the image as will have a smaller radius of curvature, with the result that the equation for the curve cannot sometimes be accurately calculated.

In order to overcome this kind of disadvantage, it may be considered, as shown in FIG. 4, to set the positions of the windows W1 through W5 on the basis of the left end point P, in the X-axis direction, of the maximum portion of the optically cross-sectional image S. However, as long as there is no corner in the maximum portion of the optical cross-sectional image S, it is still difficult to unequivocally determine the Y-axis coordinate value of the point P and, therefore, the positions of the windows W1 through W5 relative to the optical cross-sectional image S may deviate in the Y-axis direction.

Figure 5A:
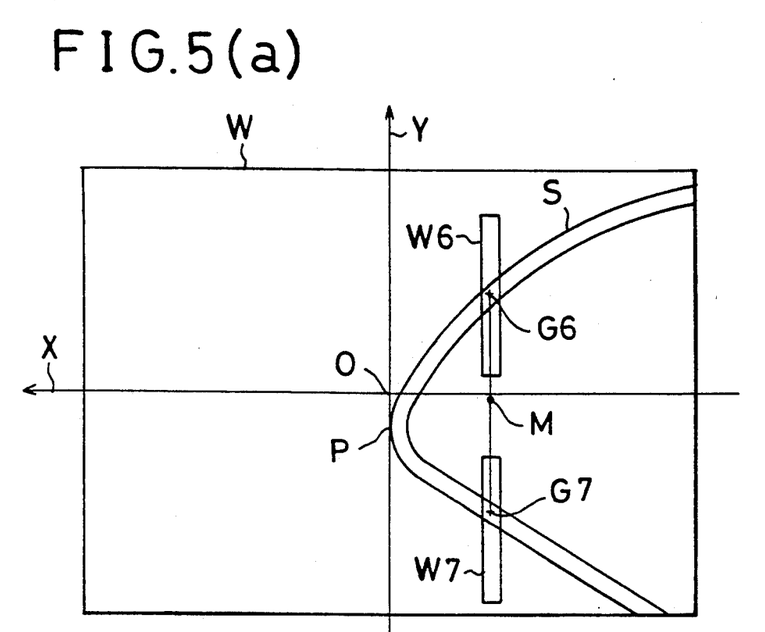
FIG. 5(a) is a diagram showing how to obtain a reference point and FIG. 5(b) is a diagram showing parameters for setting windows on the basis of the reference point.

As a solution to this problem, the following procedure is followed in this embodiment. Namely, a pair of sixth and seventh upper and lower windows W6, W7 which slenderly extend in the Y-axis direction are set, as shown in FIG. 5(a), at a predetermined distance to the right from the X-axis coordinate value of the point P. The center of gravity G6, G7 of the image in each of the windows are measured to obtain a point which has a predetermined correlation with both centers of gravity G6, G7, e.g., a reference point M which is an intermediate point of both centers of gravity G6, G7. Then, on the basis of this reference point M, as shown in FIG. 5(b), the position of each of the aforementioned windows W1 through W5 is determined.

According to this procedure, even if the position on the screen W of the optical cross-sectional image S displaces, the windows W1 through W5 can be set accurately while maintaining a predetermined correlation to the image S. As a consequence, the equations for the curve S₁ and the straight line S₂ can be correctly calculated, and the coordinate values of the crossing point Q can be accurately obtained.

Figure 5B:
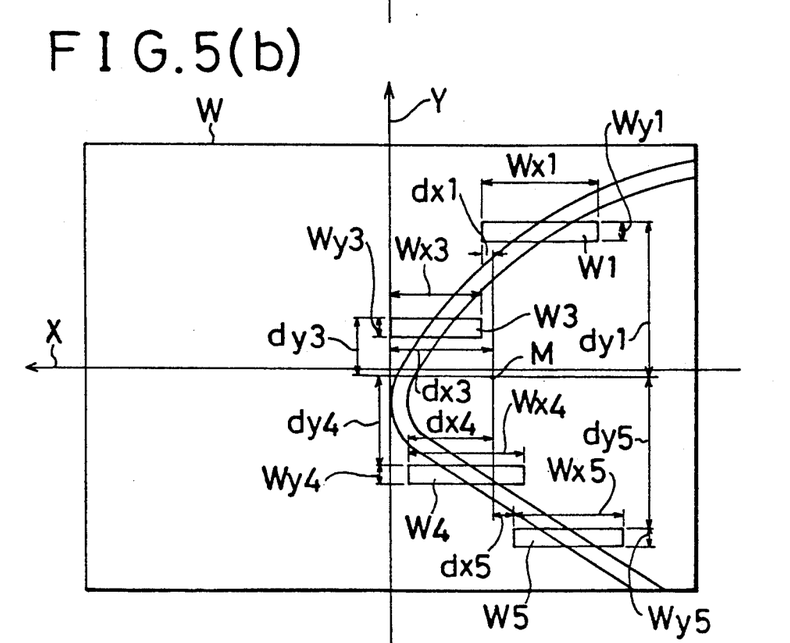

In FIG. 5(b), numerals dxn, dyn (n=1, ... 5) denote the positions in the X-axis direction and the Y-axis direction of the upper left corner of each window Wn relative to the reference point M, and numerals Wxn, Wyn denote the lengths in the X-axis direction and the Y-axis direction of each window Wn, both of which are stored in the electronic control circuit 4.

When the workpiece A displaces in the direction of the optical axis of the slit light, the optical cross-sectional image S displaces on the screen W in the X-axis direction and, at the same time, the rate of magnification of the image S also varies. This is explained with reference to FIG. 6 which shows the following conditions. Namely, the image sensing device 2 is placed at point C on a Z-axis which is defined to be the optical axis of the image sensing device 2. An X-axis and a Y-axis are defined on a reference image sensing plane W' which is away from the point C by a predetermined reference distance L. On an optically cross-sectional plane T which is inclusive of the optical axis of the slit light and which is parallel to the slit light, there are defined a U-axis in the direction of the optical axis and a V-axis which is perpendicular to the U-axis. The V-axis is made to coincide with the Y-axis, and the coordinate system is set such that the U-axis passes through the origin O of the X-Y coordinates. Let an image of a height H located on the optical cross-sectional plane T, which is away from the reference image sensing plane W' by a distance "a" in the Z-axis direction, have an image height h when it is cast on the reference image sensing plane W' with the point C as an observation point. The rate of magnification $K=h/H$ will be $L/(L-a)$.

Figure 6:
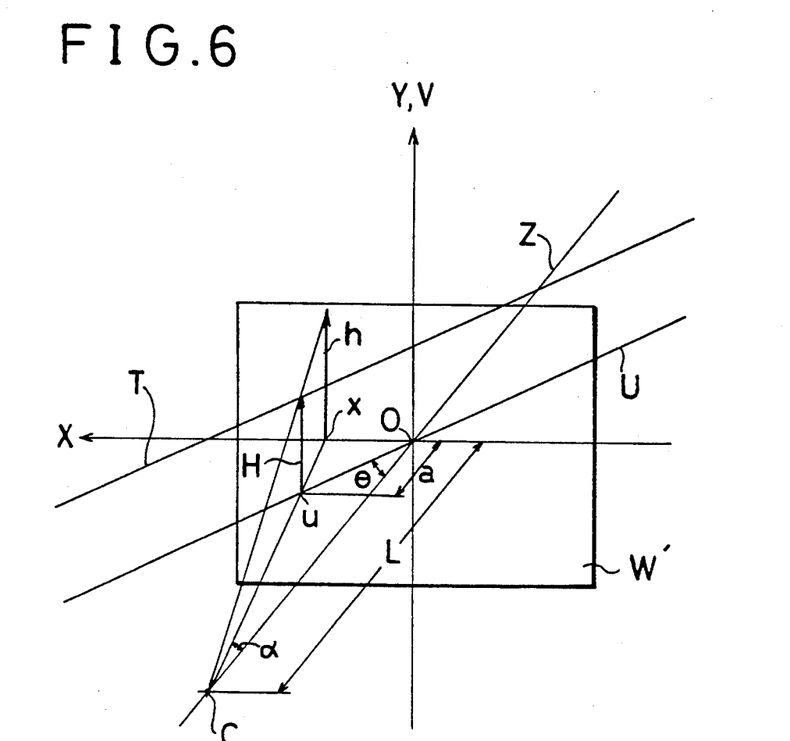
FIG. 6 is a diagram showing the principle of image changes depending on the change in the X-axis direction of the workpiece.

Let the U-axis coordinate value of H be defined to be u and the X-axis coordinate value of h be defined to be x (the left side of the origin O is in the positive and the right side thereof in the negative), "a" is $u \cos \theta$ and the rate of magnification K is $$K = L/(L - u \cos \theta) \quad (1)$$

On the other hand, let the angle formed by the line of sight from the point C to H on the X—Z coordinate plane be defined to be α. Then, $\tan \alpha = x/L$ and the X-axis coordinate value of H is $u \sin \theta$. Therefore, $$\tan \alpha = u \sin \theta /(L-a) = u \sin \theta /(L - u \cos \theta)$$

From this equation the relationship between x and u can be obtained by the following equation $$x/L = u \sin \theta /(L - u \cos \theta)$$

The value u can be represented as follows:

$$u = Lx/(L \sin \theta + x \cos \theta) \quad (2)$$

If it is rearranged by substituting the equation (2) into the equation (1), the rate of magnification K is $$K = 1 + (x/L) \cot \theta \quad (3)$$

Figure 7:
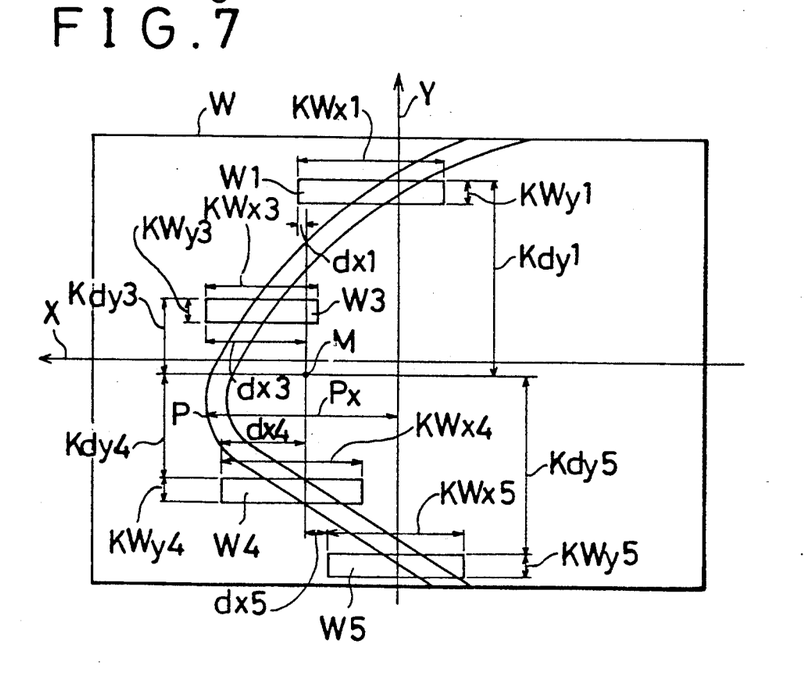
FIG. 7 is a diagram showing changes in parameters for setting the windows depending on the changes in the image.

It follows that, when the workpiece A displaces in the direction of the optical axis of the slit light, the optical cross-sectional image S displaces on the screen W in the X-axis direction. This direction of displacement is towards the left hand when the workpiece A approaches and towards the right hand when it goes away, and the size of the image S is magnified or contracted according to the rate of magnification shown in the equation (3). It is therefore preferable to change the position and the size of the windows W1 through W5 depending on the rate of magnification of the optical cross-sectional image S. Therefore, according to this embodiment, the optical measuring apparatus is so adjusted that, when the workpiece A is set in a proper position, the X-axis coordinate, on the screen W, of the left end point P of the optical cross-sectional image S becomes zero. When the optical cross-sectional image S displaces in the X-axis direction, the rate of magnification K is obtained by substituting the X-axis coordinate value Px of the point P for x in the equation (3). In this manner, the Y-axis coordinate value of each window Wn is changed to the value obtained by multiplying the aforementioned dyn by K. The size of each window Wn is also changed depending on the rate of magnification K so that each of the windows W1 through W5 may be set in a predetermined position on the optical cross-sectional image S.

Furthermore, in the measurement of the shape by picture processing, there are cases where errors may occur due to distortion of the lens system of the image sensing device 2, to the image's being out of focus, or to the displacement in the relative positional relationship between the projector 1 and the image sensing device 2 attributable to the errors in machining the base plate and/or the errors in mounting the projector 1 and the image sensing device 2 on the base plate 3.

Figure 8:
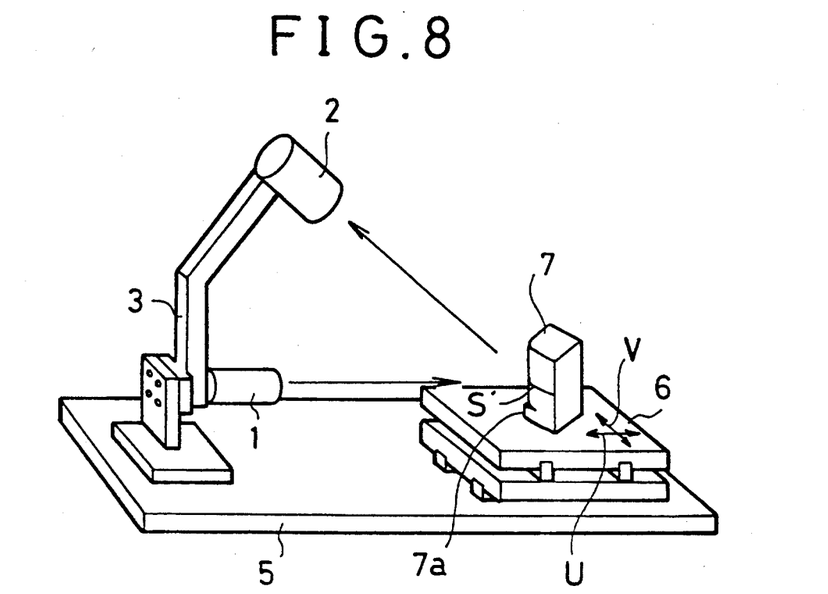
FIG. 8 is a perspective view showing the layout of an apparatus for measuring an error.
Figure 9:
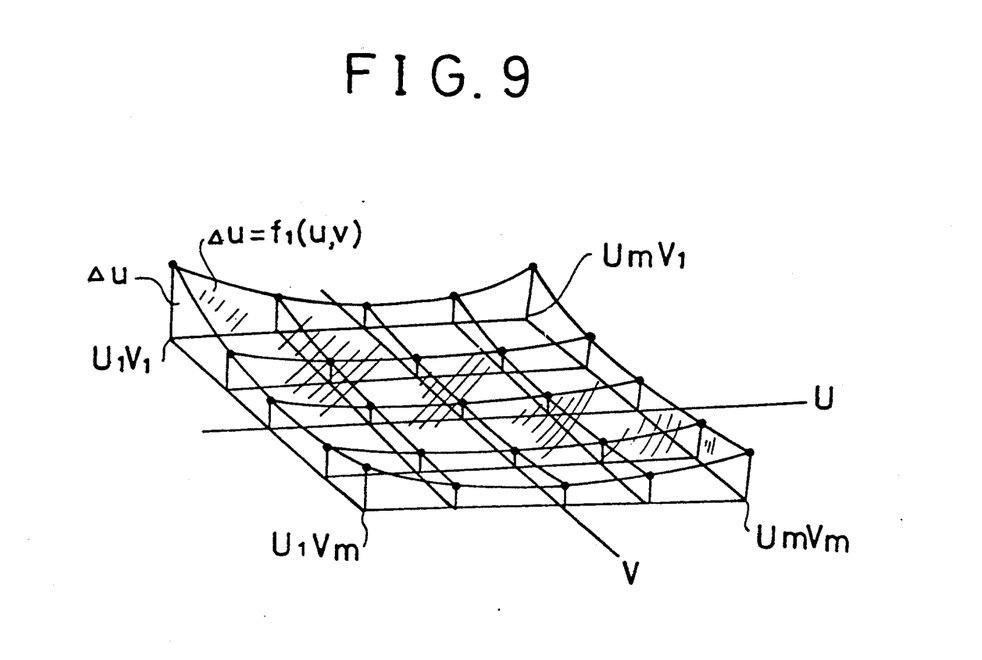
FIG. 9 is a diagram showing, in three dimensions, the errors measured on coordinate plane which corresponds to the optically sectional plane.

Therefore, as shown in FIG. 8, the following procedure is followed. Namely, the optical measuring apparatus is mounted on a surface plate 5. There is provided on the surface plate 5 a table 6 which is movable in the two crossing directions on the optical cross-sectional plane, i.e., in the aforementioned U-axis direction and the V-axis direction. A reference block 7 which is similar in shape to the workpiece A is placed on the table 6 to measure the errors in advance. In more detail, the reference block 7 is sequentially moved by the table 6 so that an imaginary corner point of the reference block 7, which point corresponds to the below-mentioned crossing point, coincides respectively with a plurality of points $U_1V_1, \ldots U_mN_m$ which are set on the optical cross-sectional plane. The slit light is radiated from the projector 1 at each of the aforementioned points on the reference block 7 to picture by the image sensing device 2 the optically cross-sectional image S' on the reference block 7. From the optical cross-sectional image on the screen of the image sensing device 2, the position of the crossing point (i.e., the point corresponding to the aforementioned Q) of the two lines constituting the image is obtained in the same manner as described above. The errors Δu, Δv in the U-axis direction and the V-axis direction between those coordinate values on the optical cross-sectional plane which correspond to the crossing point, and the coordinate values of the measured point are measured at each of the measuring points. In this embodiment, an edge 7a which coincides with the aforementioned imaginary corner point is formed at the base portion of the reference block 7 so that the reference block 7 can be accurately set to the measuring point by using the edge portion 7a as a guide. FIG. 9 is a diagram showing in three dimensions the respective $\Delta u$ at each of the plurality of measuring points $U_1V_1, \ldots U_mN_m$. A correction equation $\Delta u = f_1(u, v)$ representing the $\Delta u$ is obtained from the data of $\Delta u$ by means of repeated regressions. Similarly, a correction equation $\Delta v = f_2(u,v)$ representing the $\Delta v$ is obtained. By adding or deducting the correction values to be obtained by these correction equations to or from those coordinate values of the crossing point Q on the optical cross-sectional plane which are obtained by the measurement of the workpiece A, the coordinate values to judge the position of the workpiece A are measured. It is thus made possible to carry out an accurate measurement by correcting at once the errors due to the aforementioned various causes.

Figure 10:
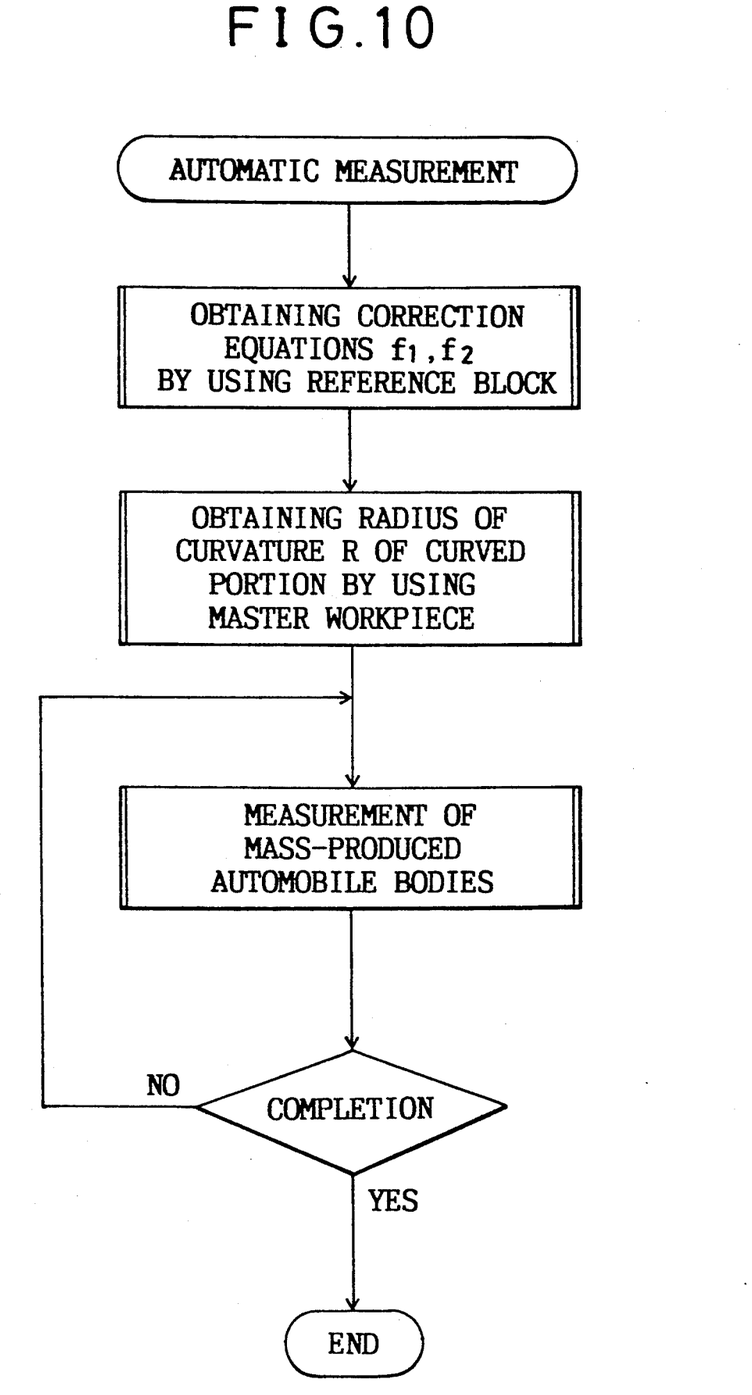
FIG. 10 is a flow chart showing overall measuring steps.
Figure 11:
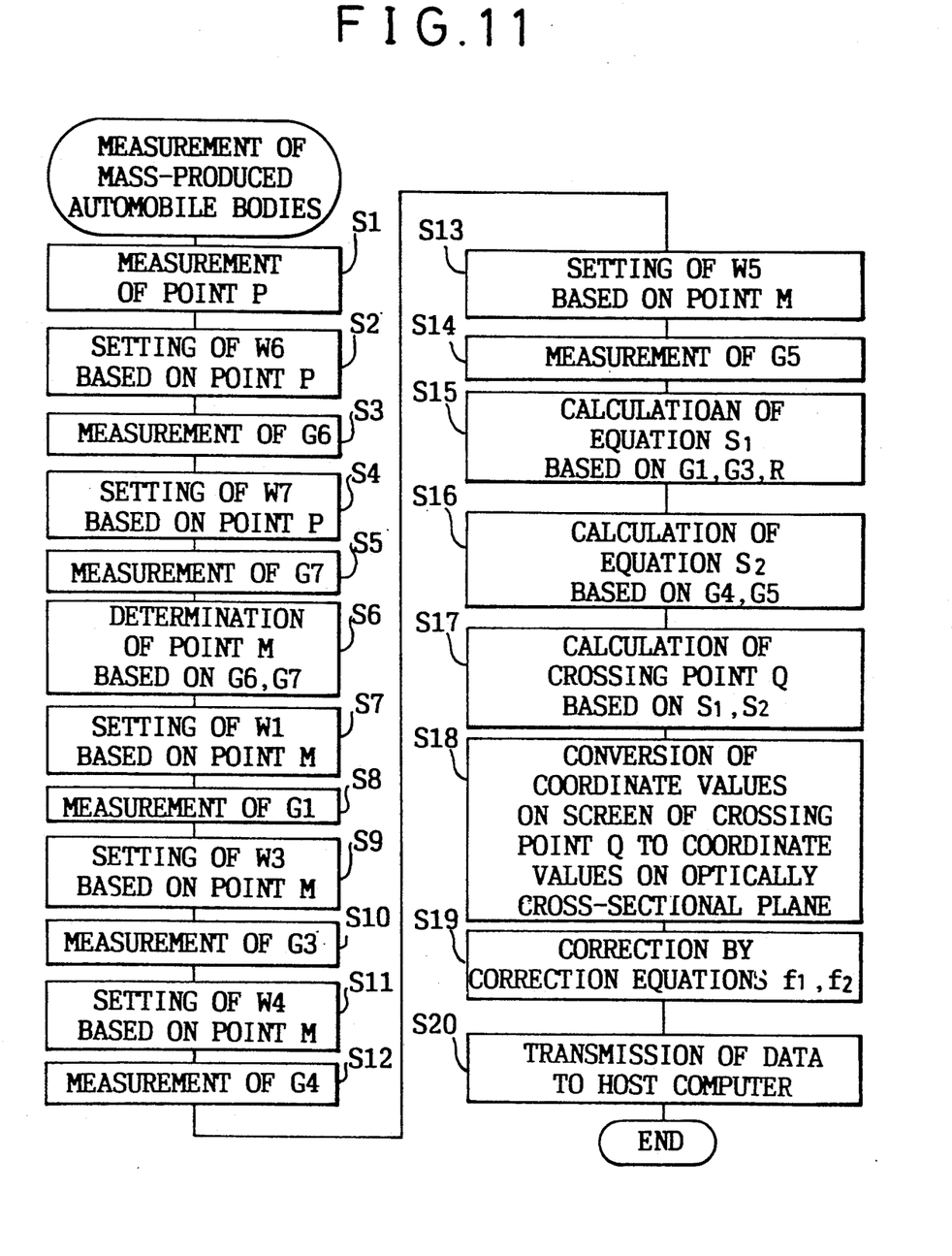
FIG. 11 is a flow chart showing treating steps in measuring the workpiece.

The aforementioned steps are represented in FIG. 10. Namely, the correction equations $f_1$, $f_2$ are first obtained by measuring errors and then the radius of curvature R is obtained by using the master workpiece. Thereafter, the measurement of the mass-produced automobile bodies are carried out. In this measurement, as shown in FIG. 11, the position of the left end point P of the optical cross-sectional image S is first obtained (S1), and then the sixth window W6 is set on the basis of the point P (S2). The position of the center of gravity G6 of the image in the window W6 is measured (S3). Further, the seventh window W7 is set on the basis of the point P (S4). The center of gravity G7 of the image in the window W7 is then measured (S5). The reference point M is determined from the positions of both centers of gravity G6, G7 (S6).

Then, on the basis of the reference point M, the first window W1 is set and the position of the center of gravity G1 of the image in the window W1 is measured (S7, S8). Similarly, the windows W3, W4, W5 are set in sequence and the positions of centers of gravity G3, G4, G5 of the images in respective windows are measured (S9 ... S14).

Figure 12:
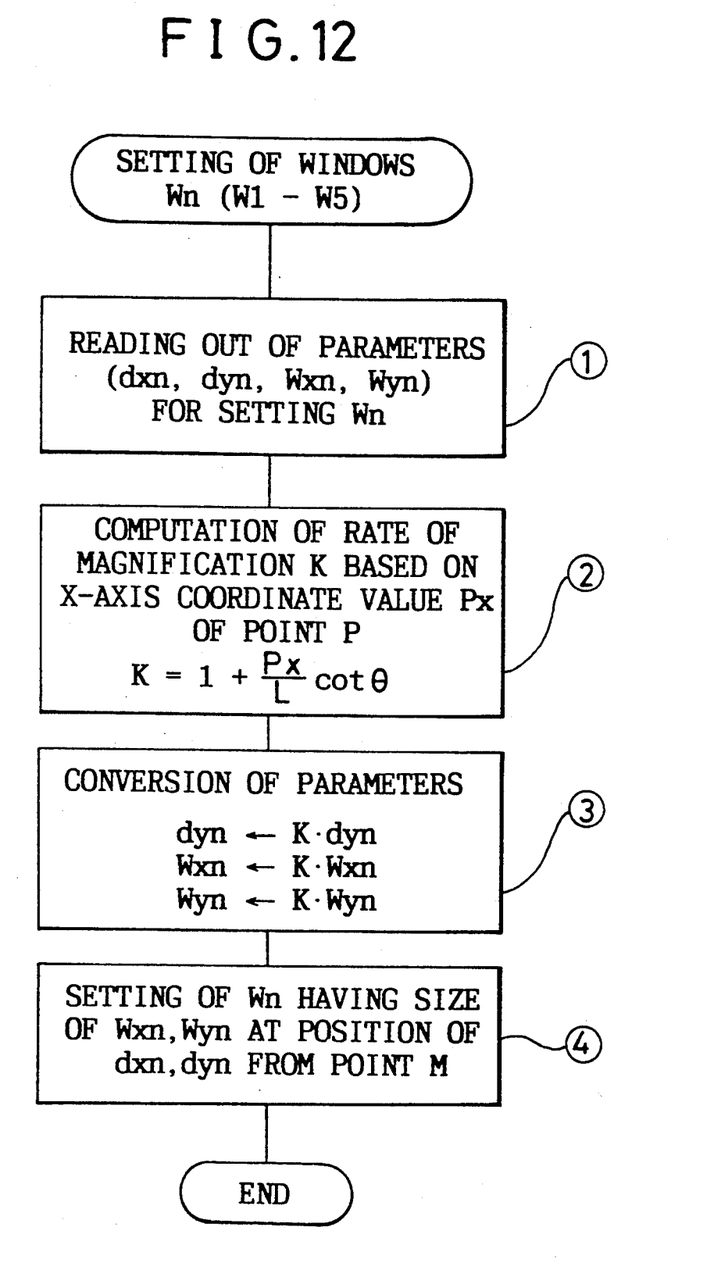
FIG. 12 is a flow chart showing steps of setting windows.

The setting procedure of each of the windows W1 through W5 is as shown in FIG. 12. Namely, the parameters dxn, dyn, Wxn, Wyn representing the respective position and the size of each window Wn are read out of the memory (①). Then, a rate of magnification corresponding to the X-axis coordinate value of the point P is obtained (②). The values dyn, Wxn, Wyn are respectively converted to K·dyn, K·Wxn, K·Wyn (③) and a window Wn having a size of Wxn, Wyn is set in a position dxn, dyn from the reference point M (④).

As shown in FIG. 11, after having measured the points of centers of gravity G1 through G5, the equation of the curve $S_1$ is calculated from G1, G3 and the radius obtained by multiplying the aforementioned radius of curvature R by the aforementioned rate of magnification K (S15). Then, the equation of the straight line $S_2$ is calculated from G4 and G5 (S16), and from both of these equations the position of the crossing point Q is obtained (S17). Thereafter, the coordinate values on the screen W of the crossing point Q are converted to the coordinate values on the optically cross-sectional plane (S18). Correction values to be obtained by the correction equations $f_1$, $f_2$ are added to or subtracted from the aforementioned coordinate values (S19). The coordinate values thus corrected are transmitted as positional data of the workpiece A to a host computer which judges the assembling accuracy of the automobile body (S20). In this manner, the measuring procedure is finished.

It is readily apparent that the above-described picture processing method in an optical measuring apparatus meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A picture processing method in an optical measuring apparatus which comprises a projector for radiating a slit light on a workpiece, and an image sensing device for picturing an optical cross-sectional image drawn by said slit light radiated on the workpiece, an optical axis of said slit light and an optical axis of said image sensing device being disposed in such a positional relationship as to cross each other at an oblique angle, said method comprising the steps of:
setting windows at predetermined positions of the optical cross-sectional image on a screen of said image sensing device; and measuring a position of center of gravity of each optical cross-sectional image in each of said windows;

wherein an amount of displacement in an X-axis direction of said optical cross-sectional image on said screen is measured, said X-axis being defined to be such a coordinate axis of said screen as to correspond to said optical axis of said slit light;

a rate of magnification of said optical cross-sectional image in a Y-axis direction is calculated from said amount of displacement, said Y-axis being defined to be perpendicular to said X-axis; and at lest setting positions of said windows in the Y-axis direction and sizes thereof in the y-axis direction are changed depending on said rate of magnification.

2. A picture processing method in an optical measuring apparatus which comprises a projector for radiating a slit light on a workpiece, and an image sensing device for picturing an optical cross-sectional image drawn by said slit light radiated on the workpiece, an optical axis of said slit light and an optical axis of said image sensing device being disposed in such a positional relationship as to cross each other at an oblique angle, said method comprising the steps of:
setting predetermined windows in respective portions positioned on both Y-axis sides of the optical cross-sectional image relative to a maximum portion of said optical cross-sectional image, said maximum portion being located in an X-axis direction which is defined to be such a coordinate axis on a screen of said image sensing device as to correspond to an optical axis of said slit light, said Y-axis being defined to be perpendicular to said X-axis; and measuring a position of center of gravity of each of said optical cross-sectional image in each of said predetermined windows;

wherein a position of a tip, in the X-axis direction, of said maximum portion of said optical cross-sectional image is measured;

two pieces of windows which are elongated in the Y-axis direction are set at a position which is a predetermined distance backwardly away from said tip in the X-axis direction;

a position of center of gravity of said optical cross-sectional image in each of said two pieces of windows is measured;
a reference point which has a correlation with both of said positions of centers of gravity is obtained;
said predetermined windows are respectively set in a predetermined positional relationship relative to said reference point;
an amount of displacement, on said screen, of said optical cross-sectional image in the X-axis direction is measured;
a rate of magnification of said optical cross-sectional image in the Y-axis direction is calculated from said amount of displacement; and
at least the positional relationship in the Y-axis direction relative to said reference point and the size in the Y-axis direction of said predetermined windows are changed depending on said rate of magnification.

3. A picture processing method in an optical measuring apparatus according to claim 2, wherein said predetermined windows are set in a plurality of positions at those portions of said optical cross-sectional image which are positioned on both sides of said Y-axis direction relative to said maximum portion;
an equation of a line on one side of said Y-axis direction is calculated from positions of those centers of gravity of said optical cross-sectional image which are measured in said plurality of windows set on said one side;
an equation of a line on the other side of said Y-axis direction is calculated from positions of those centers of gravity of said optical cross-sectional image which are measured in said plurality of windows positioned on said the other side; and
a position of a crossing point of said line on said one side and said line on said the other side is obtained from both of said equations.

4. A picture processing method in an optical measuring apparatus according to claim 3, wherein at least one of said one side of said Y-axis direction and said the other side of said Y-axis direction comprises a curved portion, and an equation for said curved portion is calculated as one representing a circular arc which is regarded to be formed in a predetermined region of said curved portion;
wherein a master workpiece is used to picture an optical cross-sectional image thereof;
at least three pieces of windows are set in such a region of said optical cross-sectional image on a screen as will correspond to said predetermined region of said curved portion;
positions of center of gravity of said optical cross-sectional image in said windows are measured;
a radius of curvature of said predetermined region is obtained from said positions of centers of gravity;
when an optical cross-sectional image of the workpiece is picture, two pieces of windows which are similar to two pieces among said windows are set in said predetermined region of said optical cross-sectional image on said screen;
positions of centers of gravity of said optical cross-sectional image in said two pieces of windows are measured; and
an equation to represent said circular arc in said predetermined region is calculated from said positions of centers of gravity in said two pieces of windows and said radius of curvature.

5. A picture processing method in an optical measuring apparatus according to claim 3, wherein a reference block having a shape identical to, or similar to, a workpiece is disposed in opposite relationship to said optical measuring apparatus;
an optical cross-sectional image of said reference block is pictured while said reference block is moved to a plurality of measuring points on an optical cross-sectional plane which is inclusive of an optical axis of said slit light and is parallel to said slit light;
at each of said measuring points an amount of displacement off a predetermined correlation between an amount of movement of said reference block on said optical cross-sectional plane and an amount of movement on a screen of an optical cross-sectional image of said reference block is measured as an error;
a correction equation for said error is obtained from said measured error; and
the position of said crossing point which is obtained form said optical cross-sectional image of said workpiece is corrected by said correction equation.

* * * * *

UNITED STATES PATENT AND TRADEMARK OFFICE
CERTIFICATE OF CORRECTION

PATENT NO.:   5,311,289
DATED     :   May 10, 1994
INVENTOR(S):  YAMAOKA et al.

It is certified that error appears in the above-identified patent and that said Letters Patent is hereby corrected as shown below:

On the cover page, Item [30], the first line, "229214" should read -- 3-229214 --.

One the cover page, Item [30], the second line, "229215" should read -- 3-229215 --.

Column 10, line 36, correct "at lest" to -- at least--;
         line 37, correct "y" to -- Y --.

Column 12, line 44, correct "form" to -- from --.

Signed and Sealed this

Seventh Day of February, 1995

Attest:

BRUCE LEHMAN

Attesting Officer    Commissioner of Patents and Trademarks